(12) United States Patent
Gibson et al.

(10) Patent No.: US 9,404,461 B2
(45) Date of Patent: Aug. 2, 2016

(54) METHOD AND SYSTEM FOR ENGINE STARTING

(71) Applicant: Ford Global Technologies, LLC, Dearborn, MI (US)

(72) Inventors: Alex O'Connor Gibson, Ann Arbor, MI (US); Michael M. S. Simon, Plymouth, MI (US); Felix Nedorezov, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 253 days.

(21) Appl. No.: 13/914,416

(22) Filed: Jun. 10, 2013

(65) Prior Publication Data
US 2014/0336910 A1    Nov. 13, 2014

Related U.S. Application Data

(60) Provisional application No. 61/821,110, filed on May 8, 2013.

(51) Int. Cl.
*F02N 11/08* (2006.01)
*B60W 30/192* (2012.01)
*F02P 5/15* (2006.01)

(52) U.S. Cl.
CPC ............ *F02N 11/08* (2013.01); *B60W 30/192* (2013.01); *F02N 11/0818* (2013.01); *F02N 2200/023* (2013.01); *F02N 2300/102* (2013.01); *F02P 5/1506* (2013.01); *F02P 5/1508* (2013.01)

(58) Field of Classification Search
CPC ........ F02D 41/061; F02D 41/06; F02N 11/08; F02N 11/10
USPC .............................. 123/179.3, 179.4; 701/113
See application file for complete search history.

(56) References Cited

U.S. PATENT DOCUMENTS

| | | | |
|---|---|---|---|
| 5,052,359 A * | 10/1991 | Hardwick et al. | 123/406.45 |
| 5,863,277 A | 1/1999 | Melbourne | |
| 5,957,994 A | 9/1999 | Meyer et al. | |
| 7,028,657 B2 * | 4/2006 | Sah et al. | 123/179.3 |
| 7,096,840 B2 | 8/2006 | Asada et al. | |
| 7,134,414 B2 | 11/2006 | Ries-Mueller et al. | |
| 7,207,305 B2 * | 4/2007 | Dolker | 123/179.3 |
| 7,237,521 B2 | 7/2007 | Yuya et al. | |
| 7,341,035 B2 | 3/2008 | Kassner et al. | |
| 7,352,072 B2 * | 4/2008 | Dolker et al. | 290/30 A |
| 2003/0000750 A1 | 1/2003 | Selbertz et al. | |
| 2011/0137543 A1 | 6/2011 | Gibson et al. | |
| 2014/0238344 A1 * | 8/2014 | Douglas | F02D 41/0002 123/337 |

FOREIGN PATENT DOCUMENTS

WO    2006070338 A1    7/2006

* cited by examiner

*Primary Examiner* — Hieu T Vo
*Assistant Examiner* — Arnold Castro
(74) *Attorney, Agent, or Firm* — Julia Voutyras; Alleman Hall McCoy Russell & Tuttle LLP

(57) ABSTRACT

A method and a system for improving operation of an automatically started engine are described. In one example, engine speed is adjusted to a sole run-up speed and, held at the desired engine run-up speed for a desired period, before being ramped to an idle speed.

19 Claims, 4 Drawing Sheets

METHOD AND SYSTEM FOR ENGINE STARTING

CROSS REFERENCE TO RELATED APPLICATIONS

The present application claims priority to U.S. Provisional Patent Application No. 61/821,110, filed on May 8, 2013, the entire contents of which are hereby incorporated by reference for all purposes.

FIELD

The present description relates to a method and system for starting an engine. The method and system may be particularly useful for improving starting of an engine that is started automatically while a transmission coupled to the engine is in gear.

BACKGROUND AND SUMMARY

An engine of a vehicle may be started while a transmission coupled to the engine is in gear. By starting the engine while the transmission is in gear, it may be possible to respond in a timely manner to a request to launch a vehicle from rest. However, starting an engine while a transmission coupled to the engine is in gear also presents vehicle drivability issues. For example, if the engine is started and it produces more than a desired amount of torque at vehicle wheels, vehicle drivability may degrade. One way to control engine torque through a vehicle driveline is to control torque converter impeller speed. By limiting torque converter impeller speed, it may be possible to control driveline torque and improve vehicle drivability. However, it may be challenging to provide consistent engine speed run-up from cranking speed to idle speed during engine starting since cylinder air charge may be large during engine starting while engine intake manifold pressure is high.

The inventors herein have recognized the above-mentioned issues and have developed an engine starting method, comprising: rotating an engine to a cranking speed; adjusting engine speed to a sole desired run-up speed greater than the cranking speed and less than an idle speed; and after the engine speed is held at the desired run-up speed for a desired period, adjusting engine speed to the idle speed.

By adjusting an engine speed to a sole engine run-up speed during engine starting, it may be possible to reduce the possibility of overshooting a desired engine speed during engine run-up to idle speed. In particular, an engine actuator may be operated to adjust engine speed to a sole run-up speed. And after the engine speed is held at the desired run-up speed for a desired period, the actuator may be adjusted such that engine speed is adjusted to an idle speed, where the idle speed is greater than the engine run-up speed and where the engine run-up speed is greater than engine cranking speed. Controlling engine speed to a sole engine run-up speed, holding engine speed at the desired run-up speed for a desired period, and ramping engine speed to a desired engine idle speed may improve vehicle launch smoothness and consistency as compared to attempting to lower an engine speed gradient during engine starting.

The present description may provide several advantages. In particular, the approach may improve engine starting by improving engine speed control during engine starting. Further, the approach may reduce engine emissions by providing consistent engine starts. Further still, the approach may improve vehicle drivability.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
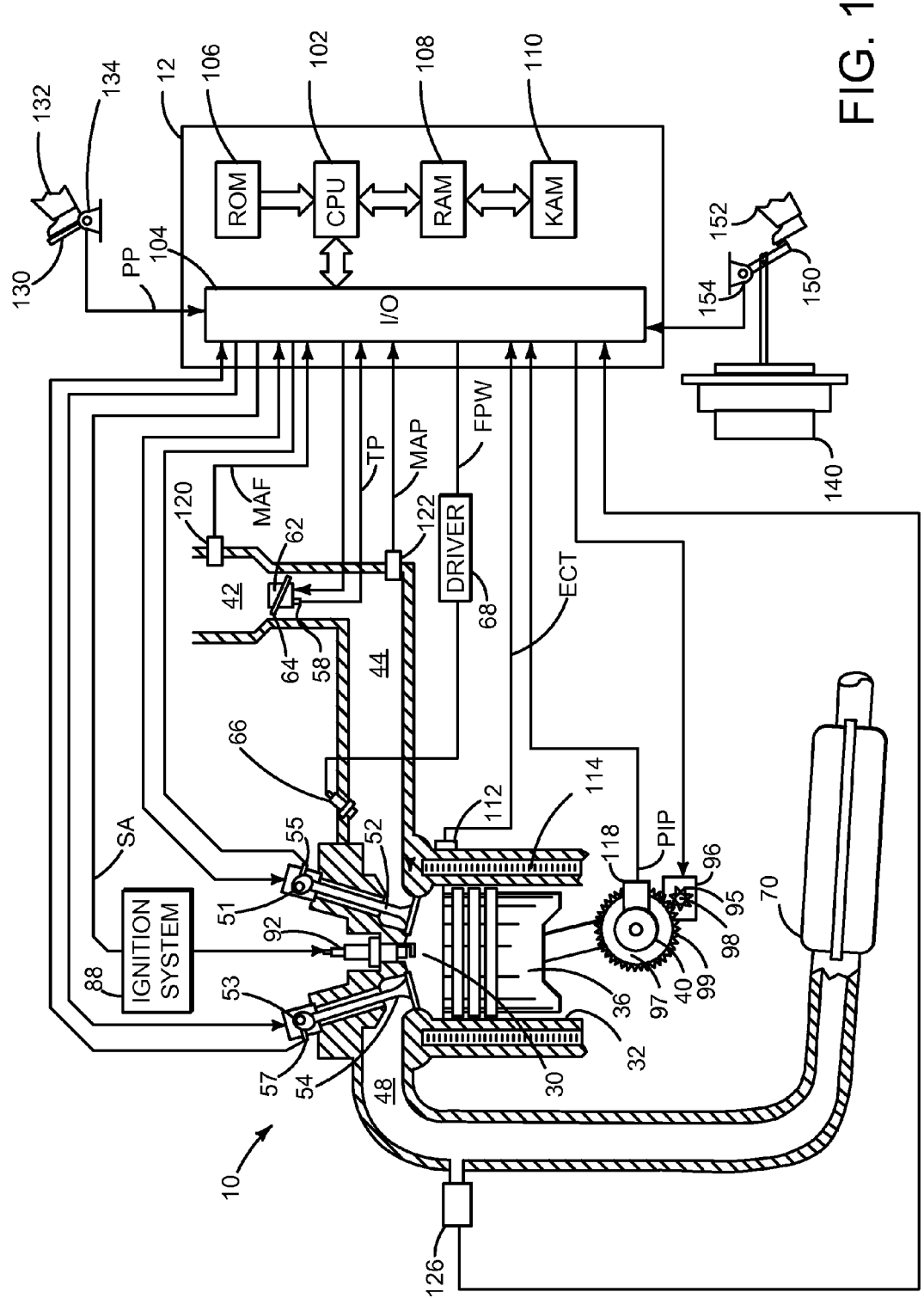
FIG. 1 is a schematic diagram of an engine.
Figure 2:
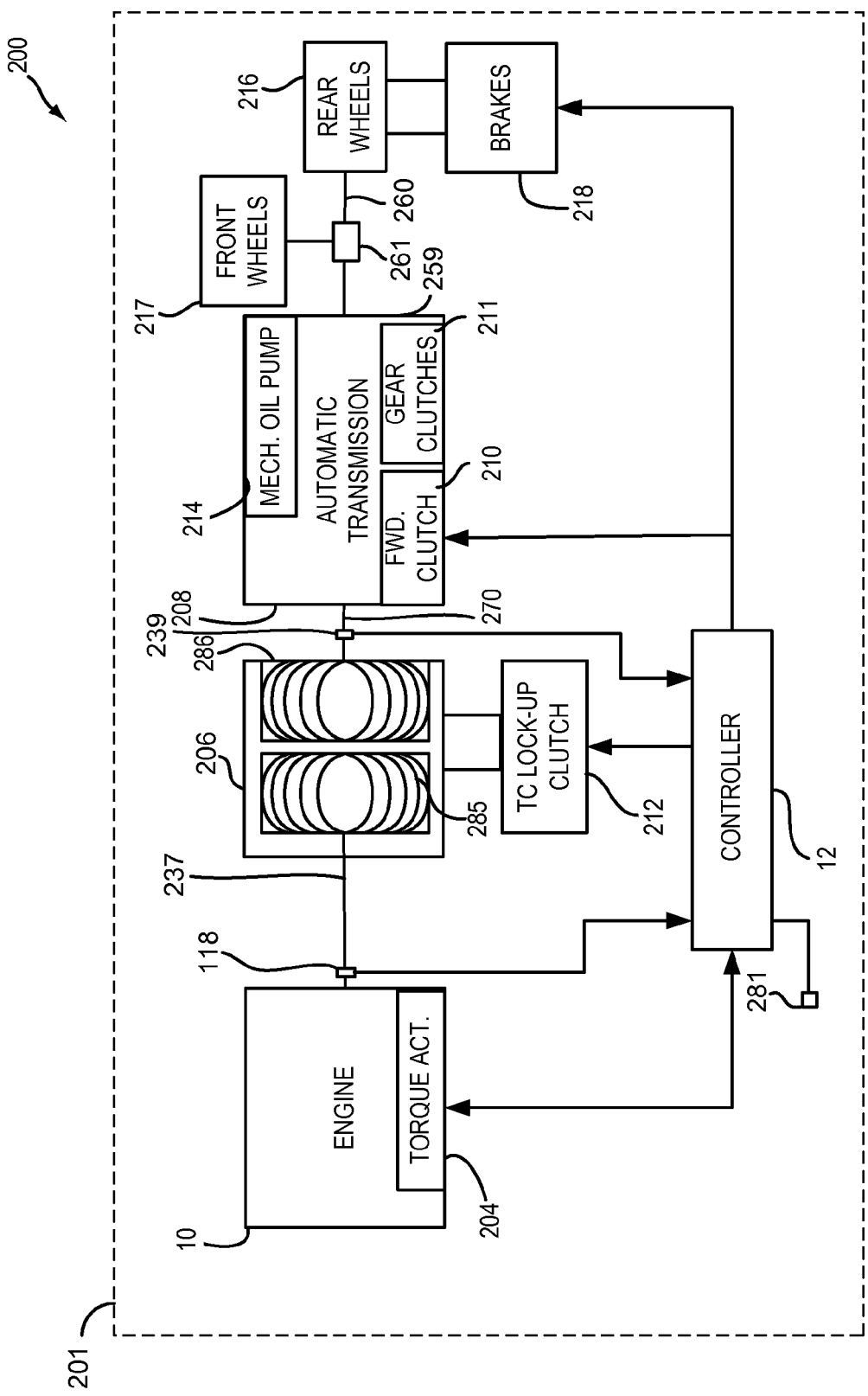
FIG. 2 shows an example vehicle and vehicle driveline configuration.
Figure 3:
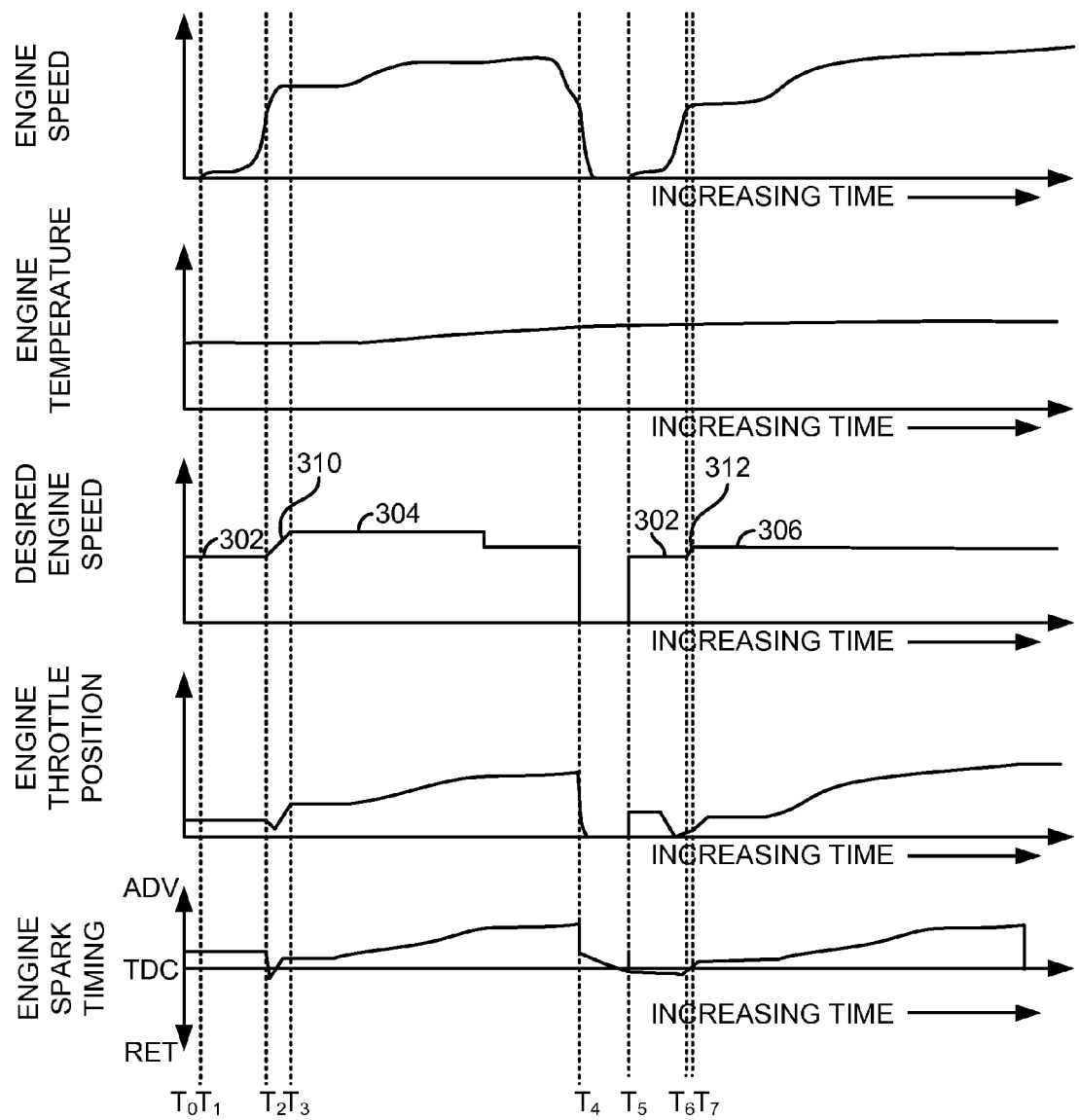
FIG. 3 shows a prophetic engine starting sequence.

The present description is related to controlling a vehicle powertrain. The vehicle may include an engine and transmission as is shown in FIGS. 1-2. The engine may be started while a transmission is in gear as is shown in FIG. 3. The engine may be started according to the method described in FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter motor 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel into an intake port of cylinder 30, which is known to those skilled in the art as port fuel injection. Alternatively, fuel may be injected directly into a cylinder, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Vehicle wheel brakes may be provided when brake pedal 150 is applied via foot 152. Brake pedal sensor 154 supplies a signal indicative of brake pedal position to controller 12. Foot 152 is assisted by brake booster 140 applying vehicle brakes.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. Engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 201 and vehicle driveline 200. Driveline 200 may be powered by engine 10. Engine 10 may be started with the starter motor shown in FIG. 1. Further, engine 10 may generate or adjust torque via torque actuator 204, such as a fuel injector, throttle, etc.

An engine output torque may be transmitted to an input side of impeller 285 of torque converter 206 via shaft 237. Torque converter 206 includes a turbine 286 to output torque to transmission input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 118 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the transmission torque converter lockup clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to rear wheels 216 to propel the vehicle via output shaft 260. Specifically, automatic transmission 208 may transfer an input driving torque at the input shaft 270 responsive to a vehicle traveling condition before transmitting an output driving torque to the rear wheels 216. Torque may also be directed to front wheels 217 via transfer case 261.

Further, a frictional force may be applied to wheels 216 by engaging wheel brakes 218. In one example, wheel brakes 218 may be engaged in response to the driver pressing his foot on a brake pedal (150 in FIG. 1). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine, for example. Thus, the hydraulic pressure generated in mechanical oil pump 214 may increase as an engine speed increases, and may decrease as an engine speed decreases.

Controller 12 may be configured to receive inputs from engine 10, as shown in more detail in FIG. 1, and accordingly control a torque output of the engine and/or operation of the torque converter, transmission, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. Engine control may be performed on a cylinder-by-cylinder basis to control the engine torque output.

When idle-stop conditions are satisfied, controller 42 may initiate engine shutdown by shutting off fuel and spark to the engine. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate the engine by resuming combustion in engine cylinders.

Thus, the system of FIGS. 1 and 2 provides for a vehicle system, comprising: an engine; an actuator coupled to the engine; and a controller including executable instructions stored in non-transitory memory, the executable instructions providing for rotating the engine to a cranking speed and adjusting the actuator to control engine speed to a sole engine run-up speed that is greater than the cranking speed and less than an engine idle speed during engine run-up. The vehicle system includes where the actuator is an ignition system, and further comprising additional instructions to the sole engine run-up speed for a desired period before achieving the engine idle speed during engine run-up. The vehicle system further comprises additional instructions for varying the engine idle speed in response to engine operating conditions. The vehicle system further comprises additional instructions for ramping engine speed from the sole engine run-up speed to the engine idle speed, after the desired engine run-up speed is held for a desired period. The vehicle system further comprises additional instructions for adjusting a rate the engine speed is ramped to the engine idle speed. The vehicle system further comprises additional instructions for automatically restarting the engine.

Referring now to FIG. 3, an example engine starting sequence is shown. The engine starting sequence may be performed via the system shown in FIGS. 1 and 2. The sequence shown in FIG. 3 may be provided by executing instructions according to the method of FIG. 4. Vertical markers at times $T_1$-$T_7$ indicate times of interest in the sequence.

The first plot from the top of FIG. 3 shows engine speed versus time. The Y axis represents engine speed and engine speed increases in the direction of the Y axis arrow. The X axis represents time and time increases from the left hand side of FIG. 3 to the right hand side of FIG. 3.

The second plot from the top of FIG. 3 shows engine temperature versus time. The Y axis represents engine temperature and engine temperature increases in the direction of the Y axis arrow. The X axis represents time and time increases from the left hand side of FIG. 3 to the right hand side of FIG. 3.

The third plot from the top of FIG. 3 shows desired engine speed versus time. The Y axis represents desired engine speed and desired engine speed increases in the direction of the Y axis arrow. The X axis represents time and time increases from the left hand side of FIG. 3 to the right hand side of FIG. 3. Desired engine speed is a speed the engine is controlled to absent a driver demand torque (e.g., a desired torque input via an accelerator pedal by a driver). Desired engine speed may be based on a desired engine run-up speed or a desired engine idle speed.

The fourth plot from the top of FIG. 3 shows engine throttle position versus time. The Y axis represents engine throttle position and engine throttle opening amount increases in the direction of the Y axis arrow. The X axis represents time and time increases from the left hand side of FIG. 3 to the right hand side of FIG. 3.

The fifth plot from the top of FIG. 3 shows engine spark timing versus time. The Y axis represents engine spark timing and engine spark timing is advanced from top dead center compression stroke when the spark timing trace is above the X axis. Spark timing is retarded from top dead center compression stroke when the spark timing trace is below the X axis. The X axis represents time and time increases from the left hand side of FIG. 3 to the right hand side of FIG. 3.

At time $T_0$, engine speed is zero indicating that the engine is stopped. The engine may be automatically stopped without a driver or operator providing input to a device that has a sole purpose or function of starting and/or stopping the engine (e.g., an ignition switch). In one example, the engine may be automatically stopped in response to driver demand torque being less than a threshold torque. The desired engine speed is set to a value described 302 by a sole desired engine run-up speed. For example, the sole engine run-up speed may be a value of 600 RPM, and the desired engine run-up speed does not change with cranking time, time since zero engine speed, or number of combustion events. The engine temperature is at a middle level and the engine throttle is partially opened. The engine spark timing is slightly advanced, but spark is not delivered to the engine since the engine is not rotating.

At time $T_1$, an engine start request is made (not shown) and the engine begins to rotate as indicated by engine speed increasing. The engine temperature remains at a middle level and the desired engine speed remains at the desired engine run-up speed 302. Actuators of the engine (e.g., spark timing and throttle position) are adjusted to positions directed to achieving the desired engine run-up speed as reflected in the desired engine speed. The throttle is partially opened, or closed, and the spark timing is advanced from top dead center compression stroke.

At time $T_2$, the engine has accelerated via combustion in engine cylinders to being within a threshold speed of the desired engine run-up speed. After the desired engine run-up speed is held for a desired period (e.g., a period of time or engine combustion events), the desired engine speed begins ramping at a first ramp rate 310 to a first desired engine idle speed 304. The first desired engine idle speed is based on engine temperature. The ramp rate from desired run-up speed 302 to the first desired idle speed 304 may vary with engine operating conditions (e.g., engine temperature, time since engine stop, and barometric pressure). Adjusting the ramp rate based on engine operating conditions may provide a smoother transition between desired engine run-up speed and desired engine idle speed. The engine temperature begins to increase slowly and the throttle is partially closed so as to control the engine speed trajectory during engine starting and run-up (e.g., the time between when the engine exceeds cranking speed and before the engine reaches idle speed). The spark timing is also retarded to control engine speed during run-up.

At time $T_3$, the desired engine speed reaches the desired engine idle speed and the engine speed is near the desired engine idle speed. The engine temperature continues to increase and the desired engine speed stays at the desired engine idle speed. The engine throttle position opening amount has increased and the spark timing is advanced so that the desired engine idle speed may be maintained.

Between time $T_3$ and time $T_4$, the desired engine speed is reduced in response to increasing engine temperature. In particular, desired engine speed is reduced in response to desired engine idle speed being reduced as engine temperature increases. The engine throttle position, spark timing, and engine speed vary in response to a varying driver demand torque (not shown).

At time $T_4$, combustion in the engine is automatically stopped (e.g., without a driver providing input to a device that has a sole function of starting and/or stopping the engine, such as an ignition switch) and engine speed begins to decrease. The throttle is closed and spark timing is reduced to a base timing level. Engine temperature remains at an elevated level.

At time $T_5$, an automatic engine start is requested in response to engine operating conditions. The engine is rotated via a starter motor and desired engine speed is adjusted to the desired engine run-up speed 302. The engine throttle is partially opened, or closed, and engine spark timing is retarded (e.g., the $1^{st}$ spark event may be retarded for engine stop/start engine restarts). The engine temperature remains at the same temperature as when the engine was stopped at time $T_4$.

Between time $T_5$ and time $T_6$, combustion in the engine begins and the engine speed increases in response to torque provided by combustion. The throttle opening amount is decreased so as to reduce cylinder air charge and spark timing is retarded. Reducing cylinder air charge and retarding spark timing may be useful to control engine torque so that engine speed does not go higher than is desired during run-up.

At time $T_6$, the engine has accelerated via combustion in engine cylinders to being within a threshold speed of the desired engine run-up speed. After the desired engine run-up speed is held for a desired period, the desired engine speed begins ramping at a second ramp rate 312 to a second desired engine idle speed 306. The second desired engine idle speed is based on engine temperature. The ramp rate from desired run-up speed 302 to the second desired idle speed 306 may vary with engine operating conditions (e.g., engine temperature, time since engine stop, and barometric pressure). The engine temperature stays at the elevated level and the throttle is partially closed so as to control the engine speed trajectory during engine starting and run-up. The spark timing is also retarded to control engine speed during run-up. Engine speed begins to increase as does torque converter impeller speed.

At time $T_7$, desired engine speed reaches the second desired engine idle speed 306. Engine speed settles near the desired engine speed. The throttle opening amount is increased and the engine spark timing is advanced so that engine speed is at the desired engine speed. Engine throttle position and spark timing are adjusted based on desired driver demand torque as time goes on.

In this way, engine speed may be adjusted to a sole desired engine run-up speed and after the desired engine run-up speed is held for a desired period, the engine speed is then ramped to a desired engine idle speed. Adjusting engine speed to provide a desired engine run-up speed before achieving a desired engine idle speed may improve engine starting consistency by providing a more consistent engine speed trajectory during engine starting.

Figure 4:
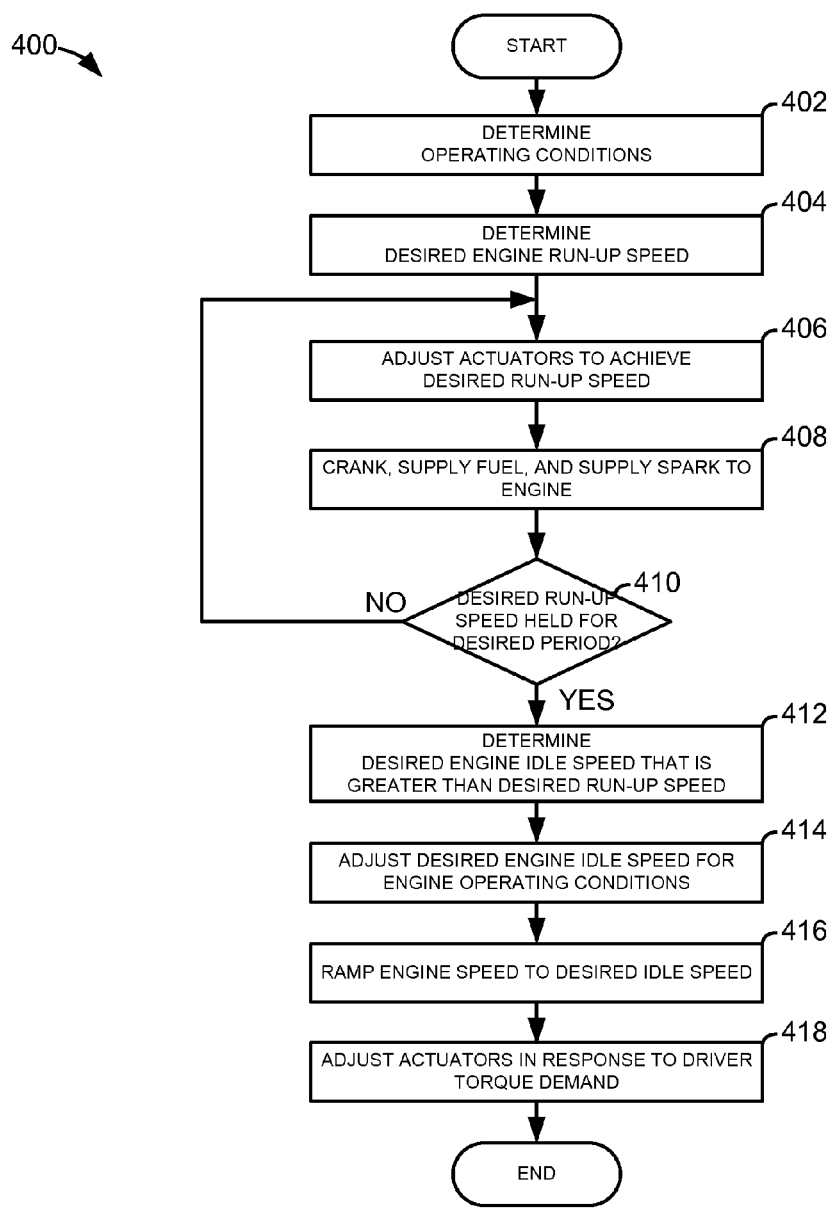
FIG. 4 shows a method for starting an engine.

Referring now to FIG. 4, a method for starting an engine is shown. The method of FIG. 4 may be provided in the system of FIGS. 1 and 2. Further, the method of FIG. 4 may provide the sequence shown in FIG. 3. The method of FIG. 4 may be stored in non-transitory memory as executable instructions.

At 402, method 400 determines vehicle and engine operating conditions. Operating conditions may include but are not limited to engine speed, vehicle speed, brake pedal position, torque converter impeller speed, torque converter turbine speed, ambient pressure and temperature. Method 400 proceeds to 404 after operating conditions are determined.

At 404, method 400 determines a desired engine run-up speed. The desired engine run-up speed may be empirically determined and stored in memory. In one example, the desired engine run-up speed takes a sole value during all engine starts. For example, a desired engine run-up speed for a four cylinder engine may be 600 RPM. Additionally, in some examples, the desired engine run-up speed does not change with engine temperature, time since engine stop, number of combustion events since engine stop, or other operating conditions. In other examples, the desired engine run-up speed may take on a sole value for an engine start, but the sole value may change between engine starts based on engine operating conditions such as engine temperature, time since engine stop, and number of engine combustion events since engine stop. In one example, the desired engine speed (e.g., the speed the engine is controlled to achieve) stays at the value of the desired engine run-up speed during cranking and for a desired period after the desired engine run-up speed is reached. The desired engine run-up speed is a speed greater than engine cranking speed (e.g., 200-300 RPM) and less than desired engine idle speed (e.g., 800 RPM). Method 400 proceeds to 406 after desired engine run-up speed is determined.

At 406, method 400 adjusts engine actuators to achieve the desired engine speed which is adjusted to the desired engine run-up speed. In one example, engine throttle position is adjusted to direct engine speed to the desired engine speed which is adjusted to the desired engine run-up speed. Spark timing, cam timing, and fuel injection timing may also be adjusted to direct engine speed to the desired engine speed. In one example, actuator adjustments for engine starting are empirically determined and stored in controller memory. Method 400 proceeds to 408 after engine actuators are adjusted.

At 408, method 400 supplies fuel, spark, and cranks the engine via a starter. Fuel timing and fuel amount are adjusted in response to engine temperature, ambient temperature, cylinder air charge, and desired engine speed. Spark timing is also adjusted in response to desired engine speed and actual engine speed relative to desired engine speed. Specific spark timing and fuel injection timings are empirically determined and stored in controller memory. Method 400 proceeds to 410 after engine fuel, spark, and cranking are initiated.

At 410, method 400 judges whether or not desired run-up speed has been held for a desired period. The desired period may be a desired period of time or engine combustion events. In one example, the period may be 0.5 seconds. In other examples, the desired period of time may be less than or greater than 0.5 seconds. If method 400 judges that engine speed is within a predetermined range of desired engine run-up speed, the answer is yes and method 400 proceeds to 412. Otherwise, method 400 returns to 406.

It should also be noted that engine speed is controlled to the desired engine speed, whether the desired engine speed is based on a desired run-up speed or a desired engine idle speed, using engine speed feedback to control engine torque actuators. Thus, although the actual engine speed is not always at the desired engine speed, it is driven toward the desired engine speed via engine speed feedback.

At 412, method 400 determines a desired engine idle speed. However, the desired engine idle speed may be determined at 404 if desired. In one example, the desired engine idle speed is empirically determined and based on warm engine idle conditions. The desired engine idle speed may be an engine speed compromise that is based on engine noise, fuel economy, and vibration.

At 414, method 400 adjusts the desired engine idle speed based on engine operating conditions. For example, if engine temperature is lower than warm operating temperature, desired engine idle speed may be increased. Also, desired engine idle speed may be increased when catalyst temperature is low. Further, desired engine idle speed may be increased when ambient temperature is low.

In some examples, method 400 also determines the engine speed ramp rate between the desired engine run-up speed and the desired engine idle speed at 414. In particular, the engine speed ramping rate may be varied with engine operating conditions such as engine temperature, ambient temperature, and a difference in speed between desired engine run-up speed and adjusted desired engine idle speed. The engine speed ramp rate may be empirically determined and stored in controller memory. Method 400 proceeds to 416 after adjusted desired engine idle speed is determined.

At 416, method 400 ramps engine speed to the adjusted desired engine idle speed. Engine speed may be ramped from desired engine run-up speed to adjusted desired engine idle speed via opening the engine throttle and increasing an amount of fuel supplied to engine cylinders. In other words, engine torque is increased to ramp engine speed to the adjusted desired engine idle speed. Method 400 proceeds to 418 after engine speed begins to ramp toward the adjusted desired engine idle speed.

At 418, method 400 adjusts engine actuators to provide a desired driver demand torque. In particular, engine throttle position, spark timing, and fuel injection timing are adjusted to provide a desired driver demand torque. Method 400 proceeds to exit after engine actuators are adjusted.

Thus, the method of FIG. 4 provides for an engine starting method, comprising: rotating an engine to a cranking speed; adjusting engine speed to a sole desired run-up speed greater than the cranking speed and less than an idle speed; and after the desired engine run-up speed is held for a desired period, adjusting engine speed to the idle speed. The method includes where the engine is rotated via a starter that selectively engages the engine. The method also includes where the engine speed is adjusted via an actuator.

In some examples, the method includes where the actuator is an ignition system, and further comprising adjusting spark timing in response to engine speed during engine run-up. The method also includes where engine run-up is while engine speed is greater than the cranking speed and less than the idle speed. The method further comprises adjusting the idle speed in response to engine operating conditions. The method includes where the engine is automatically restarted.

The method of FIG. 4 also provides for an engine starting method, comprising: rotating an engine to a cranking speed via a starter motor; adjusting an actuator to control engine speed to a sole desired run-up speed greater than the cranking speed and less than an idle speed, the sole desired run-up speed not varying with time, engine events, or engine speed during engine starting; and after the sole desired engine run-up speed is held for a desired period, adjusting engine speed to the idle speed. The method includes where adjusting engine speed to the idle speed includes ramping engine speed to the idle speed.

In some examples, the method includes where a rate that engine speed is ramped to idle speed is varied with engine operating conditions. The method further comprises varying the idle speed with engine operating conditions. The method includes where the engine is rotated via a starter motor that is selectively coupled to the engine. The method includes where further comprising closing a throttle during engine cranking to reduce cylinder air charge. The method further comprises injecting fuel to an engine cylinder during run-up.

As will be appreciated by one of ordinary skill in the art, methods described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine starting method, comprising:
    starting an engine automatically to launch a vehicle from rest while a transmission coupled to the engine is in gear, including:
        rotating the engine to a cranking speed;
        while rotating the engine at the cranking speed, closing a throttle;
        adjusting engine speed to a sole desired run-up speed greater than the cranking speed and less than an idle speed; and
        after the desired engine run-up speed is held for a desired period, adjusting engine speed to the idle speed.

2. The method of claim 1, where the engine is rotated via a starter that selectively engages the engine, and where the desired period is a period of time.

3. The method of claim 1, where the engine speed is adjusted via an actuator.

4. The method of claim 3, where the actuator is an ignition system, and further comprising adjusting spark timing in response to engine speed during engine run-up.

5. The method of claim 4, where engine run-up is while engine speed is greater than the cranking speed and less than the idle speed.

6. The method of claim 1, further comprising adjusting the idle speed in response to engine operating conditions.

7. The method of claim 1, further comprising adjusting the idle speed based on engine temperature, including decreasing the idle speed as engine temperature increases.

8. The method of claim 1, further comprising, after the desired engine run-up speed is held for the desired period, adjusting engine speed to a first idle speed if engine temperature is lower than a threshold, and adjusting engine speed to a second idle speed lower than the first idle speed if engine temperature is higher than the threshold.

9. An engine starting method, comprising:
launching a vehicle from rest while a transmission is coupled to engine gears by an automatic engine start, including:
rotating an engine to a cranking speed via a starter motor;
adjusting an actuator to control engine speed to a sole desired run-up speed greater than the cranking speed and less than an idle speed, the sole desired run-up speed not varying with time, engine events, or engine speed during engine starting; and
after the sole desired engine run-up speed is held for a desired period, adjusting engine speed to the idle speed, including ramping the engine speed to the idle speed, and varying a rate that the engine speed is ramped to the idle speed with engine operating conditions.

10. The method of claim 9, wherein varying the rate that the engine speed is ramped to the idle speed with engine operating conditions comprises varying the rate that the engine speed is ramped to the idle speed with engine temperature, ambient temperature, and a difference in speed between the sole desired engine run-up speed and the idle speed.

11. The method of claim 9, further comprising varying the idle speed with engine operating conditions.

12. The method of claim 9, where the engine is rotated via the starter motor that is selectively coupled to the engine.

13. The method of claim 9, further comprising closing a throttle during engine cranking to reduce cylinder air charge.

14. The method of claim 9, further comprising injecting fuel to an engine cylinder during run-up.

15. The method of claim 9, further comprising advancing spark timing from top dead center of a compression stroke during rotation of the engine at the sole desired run-up speed, retarding spark timing from top dead center of a compression stroke during ramping of the engine speed to the idle speed, and advancing spark timing from top dead center of a compression stroke during rotation of the engine at the idle speed.

16. A vehicle system, comprising:
an engine;
a transmission coupled to the engine;
an actuator coupled to the engine; and
a controller including executable instructions stored in non-transitory memory, the executable instructions providing for, during an automatic engine start while the transmission is in gear, rotating the engine to a cranking speed, closing a throttle during rotation of the engine at the cranking speed, adjusting the actuator to control engine speed to a sole engine run-up speed that is greater than the cranking speed and less than an engine idle speed during engine run-up, ramping engine speed from the sole engine run-up speed to the engine idle speed, and adjusting a rate engine speed is ramped to the engine idle speed based on engine temperature.

17. The vehicle system of claim 16, where the actuator is an ignition system, and the controller further comprises additional instructions to control engine speed to the sole engine run-up speed for a desired period before achieving the engine idle speed during engine run-up.

18. The vehicle system of claim 16, further comprising additional instructions for varying the engine idle speed in response to engine operating conditions.

19. The vehicle system of claim 16, further comprising additional instructions for automatically restarting the engine.

* * * * *